United States Patent
Smith et al.

(10) Patent No.: US 9,793,709 B2
(45) Date of Patent: Oct. 17, 2017

(54) CURRENT DRIVERS THAT UTILIZE SHORT CIRCUIT PROTECTION

(71) Applicant: The Boeing Company, Chicago, IL (US)

(72) Inventors: Gregory H. Smith, Placentia, CA (US); Son T. Vo, Huntington Beach, CA (US); Kenneth A. Seidner, Fountain Valley, CA (US); Troy Cobb, Santa Ana, CA (US); Shamoon Sikora, Diamond Bar, CA (US)

(73) Assignee: The Boeing Company, Chicago, IL (US)

( * ) Notice: Subject to any disclaimer, the term of this patent is extended or adjusted under 35 U.S.C. 154(b) by 577 days.

(21) Appl. No.: 14/497,062

(22) Filed: Sep. 25, 2014

(65) Prior Publication Data
US 2016/0094025 A1   Mar. 31, 2016

(51) Int. Cl.
| | | |
|---|---|---|
| H02H 11/00 | (2006.01) | |
| H02H 3/10 | (2006.01) | |
| H02M 1/32 | (2007.01) | |
| H02M 3/156 | (2006.01) | |
| H02M 1/00 | (2006.01) | |

(52) U.S. Cl.
CPC ............ *H02H 11/00* (2013.01); *H02H 3/105* (2013.01); *H02M 1/32* (2013.01); *H02M 3/156* (2013.01); *H02M 2001/0009* (2013.01)

(58) Field of Classification Search
CPC ........... H02M 1/32; H02H 3/105; H02H 3/16; H02H 11/005
See application file for complete search history.

(56) References Cited

U.S. PATENT DOCUMENTS

| | | | |
|---|---|---|---|
| 6,267,326 B1 | 7/2001 | Smith et al. | |
| 7,286,333 B2 | 10/2007 | Kubinski et al. | |
| 7,578,481 B2 | 8/2009 | Smith et al. | |
| 7,839,184 B2 | 11/2010 | Smith et al. | |
| 2002/0196644 A1* | 12/2002 | Hwang | H02M 1/0845 363/89 |
| 2009/0066304 A1* | 3/2009 | Nakabayashi | H02H 1/0046 323/282 |
| 2010/0033110 A1* | 2/2010 | Chien | H05B 33/0815 315/294 |

(Continued)

*Primary Examiner* — Stephen W Jackson
*Assistant Examiner* — Christopher Clark
(74) *Attorney, Agent, or Firm* — Duft Bornsen & Fettig LLP (57) ABSTRACT

Embodiments described herein provide short circuit detection capabilities for current drivers. One embodiment includes a controller and a current driver. The current driver includes a power switch circuit that couples a supply rail to a high side of a load in response to receiving a drive signal. The current driver further includes a continuity circuit that couples the supply rail to the high side and indicates to the controller whether a first current flow to the high side exceeds a first threshold. The current driver further includes a current sense circuit that couples a low side of the load to ground and indicates to the controller whether a second current flow from the low side exceeds a second threshold. The controller identifies, based on the first current flow, the second current flow, and the drive signal, a plurality of short circuit conditions that may exist at the current driver.

20 Claims, 6 Drawing Sheets

(56) References Cited

U.S. PATENT DOCUMENTS

2010/0066337 A1\* 3/2010 Gong ................. H02M 1/4225
 323/285
2014/0313621 A1\* 10/2014 Innes ....................... H02P 3/12
 361/24

\* cited by examiner

CURRENT DRIVERS THAT UTILIZE SHORT CIRCUIT PROTECTION

FIELD

This disclosure relates to the field of electronic circuits that provide current to loads.

BACKGROUND

Current drivers (also referred to as current sources) can be used to provide current for a variety of loads including valves, motors, explosive charges, lighting, resistive loads, etc. For instance, a current driver can be used to provide a constant current to a Light Emitting Diode (LED) to minimize variations in a brightness of the LED when the source voltage varies. When current drivers are used to operate valves, the current drivers can utilize a higher initial current to actuate the valve followed by a lower subsequent current to hold the valve in the desired position. This type of two-stage operation can reduce the power requirements of the current driver, which can provide power efficiency benefits to a system that includes valves.

Since valves include an inductive component of the total load seen by the current driver, additional power efficiencies can be gained by operating the current driver similar to a DC-DC converter, with the inductance of the valve operating to average a switching waveform of the supply voltage applied to the valve. This allows the current driver to vary the average current applied to the valve by varying a duty cycle or frequency of the switching waveform.

Often, current drivers are utilized in various space or military applications such as missiles, manned or unmanned propulsion vehicles, and spacecraft. In these applications, current drivers are used to control fuel valves, detonate ordinance, etcetera, and are expected to operate with a high degree of reliability and with a certain measure of recoverability in cases of circuit faults. However, current drivers can sometimes experience short circuit conditions which can permanently damage the drivers and compromise the performance of the missiles, manned or unmanned propulsion vehicles, or spacecraft that utilize current drivers.

SUMMARY

Embodiments described herein provide short circuit detection capabilities for current drivers that are based on an analysis of different portions of the current driver during operation. When a current driver provides current to a two terminal load from a supply rail, short circuits between the supply rail and ground, between the terminals of the load and ground, and across the load can be detected by analyzing currents that flow into and out of the load, and by analyzing drive signals that switch the load to the supply rail.

One embodiment is an apparatus that includes a controller and a current driver. The current driver includes a power switch circuit that couples a supply rail to a high side of the load in response to receiving a drive signal. The current driver further includes a continuity circuit that is coupled to the supply rail and to the high side of the load. The continuity circuit indicates to the controller whether a first current flow to the high side of the load exceeds a first threshold. The current driver further includes a current sense circuit that couples a low side of the load to ground. The current sense circuit indicates to the controller whether a second current flow from the low side of the load exceeds a second threshold. The controller identifies, based on the first current flow, the second current flow, and the drive signal, each of: a short circuit across the supply rail and the high side of the load, a short circuit across the high side of the load and the low side of the load, a short circuit across the high side of the load and ground, and a short circuit across low side of the load and ground.

Another embodiment is a method for detecting a plurality of short circuit conditions in a current driver. The method comprises determining whether a drive signal is provided to a power switch circuit of the current driver to couple a supply rail to a high side of a load. The method further comprises determining whether a first current flow to the high side of the load exceeds a first threshold, and determining whether a second current flow from a low side of the load exceeds a second threshold. The method further comprises identifying, based on the first current flow, the second current flow, and the drive signal, each of: a short circuit across the supply rail and the high side of the load, a short circuit across the high side of the load and the low side of the load, a short circuit across the high side of the load and ground, and a short circuit across the low side of the load and ground.

Another embodiment is an apparatus that includes a controller and a current driver that provides current to a load. The current driver includes a power switch that couples a supply rail to a high side of the load in response to receiving a drive signal. The current driver further includes an opto-isolator having a Light Emitting Diode (LED) optically coupled to a photon detector, where the photon detector has an output terminal coupled to the controller that indicates whether a first current flow to the high side of the load exceeds a first threshold. The current driver further includes a first resistor that couples the supply rail to an anode of the LED, a diode having a cathode coupled to the high side of the load, and an anode coupled to a cathode of the LED. The current driver further includes a second resistor that couples a low side of the load to ground and a comparator. The comparator has an inverting input coupled to the low side of the load, a non-inverting input coupled to a reference voltage that defines a second threshold based on the second resistor, and an output coupled to the controller that indicates whether a second current flow through the second resistor exceeds the second threshold. The controller identifies, based on the first current flow, the second current flow, and the drive signal, each of: a short circuit across the supply rail and the high side of the load, a short circuit across the high side of the load and the low side of the load, a short circuit across the high side of the load and the ground, and a short circuit across the low side of the load and the ground.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
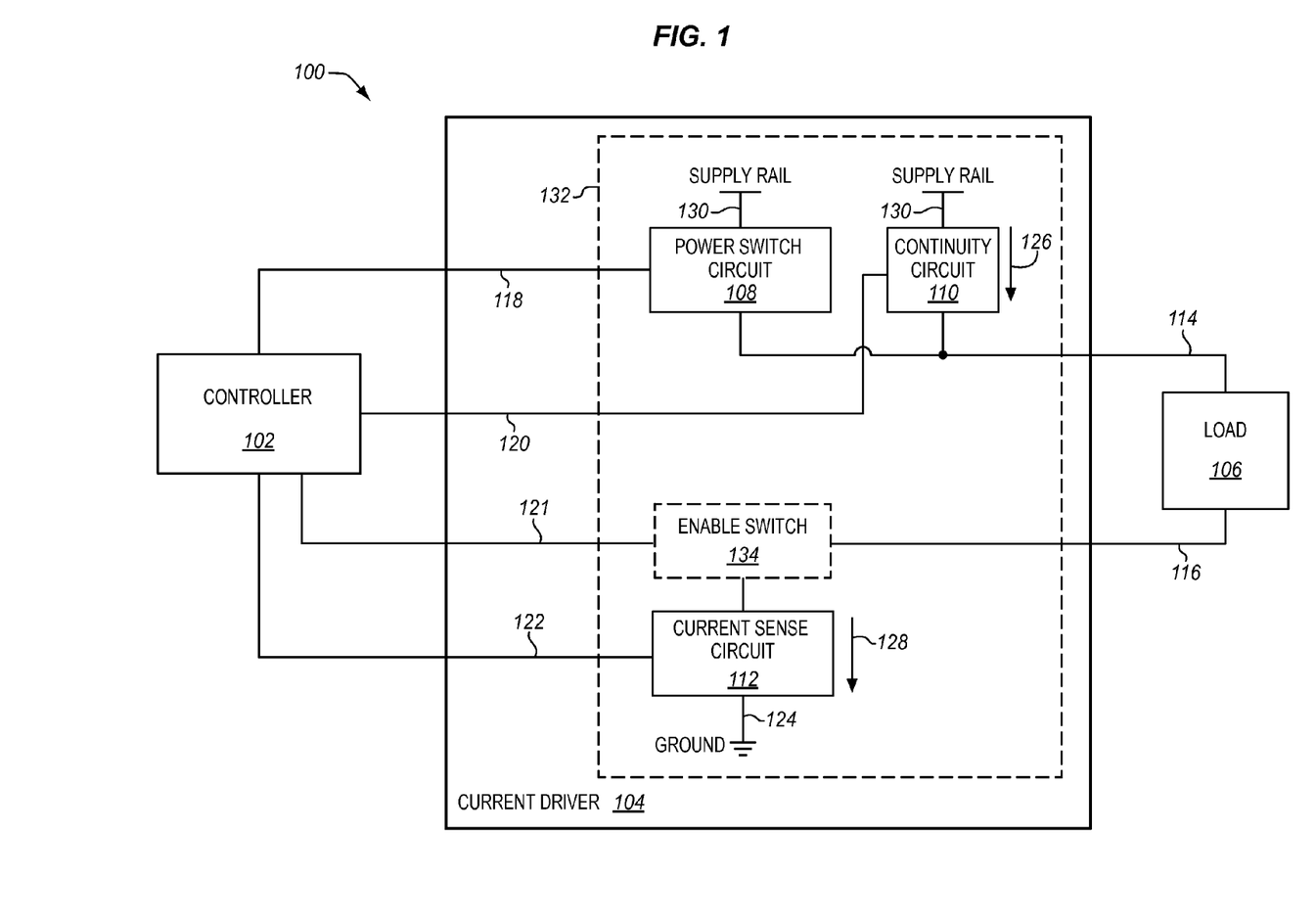
FIG. 1 is a block diagram of an apparatus for identifying short circuit conditions in a current driver in an exemplary embodiment.

FIG. 1 is a block diagram of an apparatus 100 for identifying short circuit conditions in a current driver 104 in an exemplary embodiment. Generally, apparatus 100 is capable of detecting a number of short circuit conditions that may exist at current driver 104 at start up or during operation. In this embodiment, current driver 104 provides or supplies current to a two-terminal load 106. Some examples of load 106 include valves, explosive charges, etc. For example, current driver 104 may be implemented in a missile, a manned or unmanned propulsion vehicle in order to control various valves (e.g., fuel valves) and/or to detonate explosive devices. Although only one current channel 132 is illustrated for current driver 104, current driver 104 may include a plurality of current channels as a matter of design choice. For instance, current driver 104 may include 8, 12, 16, etcetera, current channels that may be operated independently by a controller 102.

In this embodiment, current driver 104 includes a power switch circuit 108 that includes any system, component, or device that is able to couple a supply rail 130 to a high side 114 of load 106 based on a drive signal 118. High side 114 of load 106 may also be referred to herein as a first terminal of load 106. Power switch may include one or more transistors, such as a Field Effect Transistor (FET). Controller 102 provides drive signal 118 to power switch circuit 108 to controllably couple supply rail 130 to high side 114 of load 106. Some examples of power switch circuit 108 include N-channel Metal Oxide Semiconductor FETs (MOSFETs), P-channel MOSFETS, etc. Although not shown in FIG. 1, drive signal 118 may include level shifters and/or additional drive circuits along the signaling path from controller 102 to power switch circuit 108 that is based on the particular circuit implementation of power switch circuit 108. For instance, if power switch circuit 108 is an N-channel FET, then additional boost circuits may be included along the signaling path for drive signal 118 to generate a gate signal on power switch circuit 108 that is higher than the voltage of supply rail 130. If however, power switch circuit 108 is a P-channel FET, then circuits may be included along the signaling path for drive signal 118 to generate a gate signal on power switch circuit 108 that is lower than the voltage of supply rail 130. In some embodiments, drive signal 118 may be pulse-width modulated and/or frequency modulated if load 106 includes an inductive component. Using a PWM or frequency modulated drive signal 118 allows current driver 104 to operate similar to a buck-mode DC-DC converter, which improves the efficiency of current driver 104. If load 106 does not include an inductive component, then drive signal 118 may be turned on or off as desired to supply a current to load 106. For instance, if load 106 is an explosive charge or other resistive type load, then the inductive component of the overall impedance may be negligible. This allows current driver 104 to operate similar to a pure DC current source.

Current driver 104 in this embodiment further includes a continuity circuit 110 that couples supply rail 130 to high side 114 of load 106. Continuity circuit 110 may also be referred to herein as a first circuit. Continuity circuit 110 includes any system, component, or device that is able to indicate (via a continuity signal 120) whether a current flow 126 supplied by supply rail 130 to high side 114 of load 106 exceeds a first threshold. For example, if load 106 is disconnected, i.e., an open circuit, or power switch circuit 108 is turned on, then current flow 126 may be approximately zero. This is indicated to controller 102 by continuity signal 120. If load 106 is shorted, then current flow 126 exceeds first threshold, which is indicated to controller 102 by continuity signal 120.

In this embodiment, current driver 104 further includes a current sense circuit 112 that couples a low side 116 of load 106 to ground 124. Current sense circuit 112 may also be referred to herein as a second circuit, and low side 116 of load 106 may also be referred to herein as a second terminal. Current sense circuit 112 includes any component, system, or device that is able to indicate to controller 102 (via a current sense signal 122) whether a current flow 128 from low side 116 of load 106 exceeds a second threshold. For instance, during a PWM or frequency modulation of power switch circuit 108, current sense circuit 112 may indicate to controller 102 on a cycle-by-cycle basis when current flow 128 exceeds a pre-determined current, thereby allowing controller 102 to adjust the duty cycle and/or frequency of drive signal 118 to adjust the average current supplied to load 106. When load 106 is resistive, then current sense signal 122 may indicate to controller 102 that current is flowing through load 106 when power switch circuit 108 is on. In some embodiments, current driver 104 may include an enable switch 134 between low side 116 of load 106 and current sense circuit 112 that may be used to interrupt the current path between low side 116 of load 106 and ground 124. Enable switch 134 may include one or more transistors, FETs, MOSFETs, etc. Controller 102 is capable of turning enable switch 134 on or off utilizing an activation signal 121.

Figure 2:
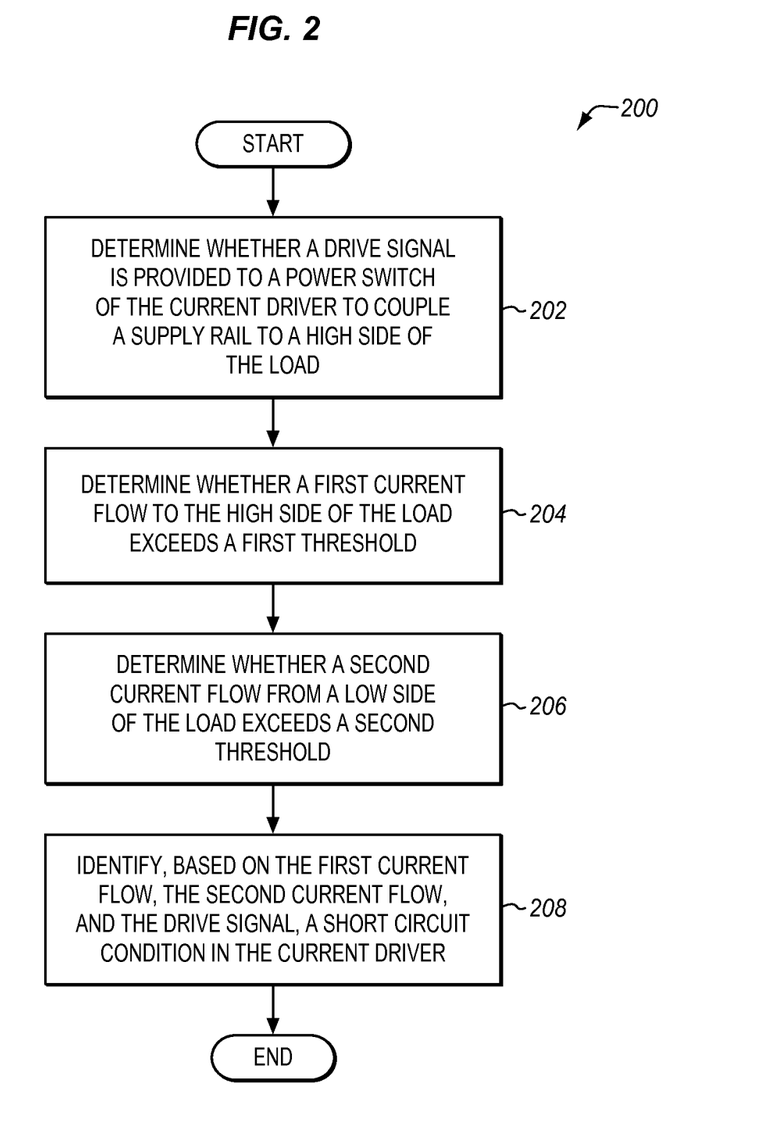
FIG. 2 is a flow chart of a method for detecting a plurality of short circuit conditions in a current driver in an exemplary embodiment.

FIG. 2 is a flow chart of a method 200 for detecting a plurality of short circuit conditions in a current driver in an exemplary embodiment. The steps of method 200 will be described with respect to FIG. 1; although one skilled in the art will understand that method 200 may be performed by other devices or systems not shown. The steps of method 200 are not all inclusive and may include other steps not shown. Further, the steps may be performed in an alternate order.

During operation, controller 102 monitors drive signal 118, continuity signal 120, and current sense signal 122 to determine if possible short circuit conditions exist for current driver 104. Controller 102 determines whether drive signal 118 is provided to power switch circuit 108 (e.g., by analyzing an internal state machine of controller 102 and/or by monitoring a voltage on drive signal 118), which indicates to controller 102 if supply rail 130 is intended to be electrically coupled to high side 114 of load 106 (see step 202 of FIG. 2). When power switch circuit 108 is on, the voltage at high side 114 of load 106 is approximately the voltage of supply rail 130. With power switch circuit 108 off, the voltage at high side 114 of load 106 is approximately the voltage of ground 124. Controller 102 determines whether current flow 126 exceeds a first threshold by analyzing continuity signal 120. When current flow 126 exceeds the first threshold, then a current path exists between supply rail 130 and high side 114 of load 106 through continuity circuit 110 (see step 204 of FIG. 2). Controller 102 further determines whether current flow 128 through current sense circuit 112 exceeds a second threshold by analyzing current sense signal 122 (see step 206 of FIG. 2). Controller 102 identifies a number of possible short circuit conditions based on drive signal 118, current flow 126, and current flow 128. Some possible short circuit conditions that may be detected include a short circuit across supply rail 130 and high side 114 of load 106, a short circuit across high side 114 of load 106 and low side 116 of load 106, a short circuit across high side 114 of load 106 and ground 124, and a short circuit across low side 116 of load 106 and ground 124. Each of these will be discussed with regard to how drive signal 118, current flow 126, and current flow 128 may be utilized to indicate the various short circuit conditions in a variety of embodiments.

With regard to a short circuit across supply rail 130 and high side 114 of load 106, this may occur in cases where power switch circuit 108 fails closed due to an internal short circuit within power switch circuit 108. For example, if power switch circuit 108 is a FET, then there may be an internal short between the drain and source of the FET. Or, there may be an electrical short between high side 114 of load 106 and supply rail 130 that bypasses power switch circuit 108 altogether. This may occur if an external connection to high side 114 of load 106 is shorted to power supply 130 inadvertently. With a short circuit between supply rail 130 and high side 114 of load 106, modifying drive signal 118 to turn power switch circuit 108 off may be unable to clear the short between supply rail 130 and high side 114 of load 106. Controller 102 determines that drive signal 118 has not been provided to power switch circuit 108 (e.g., power switch circuit 108 should be off) and analyzes continuity signal 120 to determine if current flow 126 exceeds the first threshold. With a short circuit across supply rail 130 and high side 114 of load 106, current flow 126 will be below the first threshold because a current path between supply rail 130 and high side 114 of load 106 through continuity circuit 110 is not present. With a short circuit across supply rail 130 and high side 114 of load 106, current flowing from low side 116 of load 106 to ground 124 (e.g., current flow 128) is above the second threshold because power switch circuit 108 is no longer regulating current supplied to load 106. This may be determined by controller 102 by analyzing current sense signal 122 from current sense circuit 112. To clear a short circuit between supply rail 130 and high side 114 of load 106, controller 102 may disconnect load 106 from ground 124 (e.g., using enable switch 134), and/or may disconnect supply rail 130 from power switch circuit 108, etc. Controller 102 may then re-initialize channel 132 of current driver 104 and determine if the short has been cleared. Identifying a short circuit across supply rail 130 and high side 114 of load 106 may be performed by controller 102 on a cycle-by-cycle basis while channel 132 is in a PWM and/or frequency modulation mode of operation for supplying current to load 106. For example, current flow 128 may transition above the second threshold and remain there, with current flow 126 remaining below the first threshold.

With regard to a short circuit across high side 114 of load 106 and low side 116 of load 106, controller 102 determines that drive signal 118 has been provided to power switch circuit 108 (e.g., power switch circuit 108 is on) and analyzes continuity signal 120 to determine if current flow 126 exceeds the first threshold. With a short circuit across high side 114 of load 106 and low side 116 of load 106, current flow 126 will be above the first threshold because a current path between supply rail 130 and high side 114 through continuity circuit 110 is present. With a short circuit across high side 114 of load 106 and low side 116 of load, current flowing from low side 116 of load 106 to ground 124 (e.g., current flow 128) is above the second threshold. This may be determined by controller 102 by analyzing current sense signal 122 from current sense circuit 112. To clear a short circuit across high side 114 of load 106 and low side 116 of load 106, controller 102 may disconnect load 106 from supply rail 130 by turning power switch circuit 108 off, and/or may turn off enable switch 134, etc. Controller 102 may then re-initialize channel 132 of current driver 104 and determine if the short has been cleared. Identifying a short circuit across high side 114 of load 106 and low side 116 of load 106 may be performed by controller 102 on a cycle-by-cycle basis while channel 132 is in a PWM and/or frequency modulation mode of operation for supplying current to load 106. For example, current flow 128 may transition above and below the second threshold quickly due to the loss of inductance at load 106, with current flow 126 remaining above the first threshold.

With regard to a short circuit across high side 114 of load 106 and ground 124, controller 102 determines that drive signal 118 has been provided to power switch circuit 108 (e.g., power switch circuit 108 is on) and analyzes continuity signal 120 to determine if current flow 126 exceeds the first threshold. With a short circuit across high side 114 of load 106 and ground 124, current flow 126 will be above the first threshold because a current path between supply rail 130 and high side 114 of load 106 through continuity circuit 110 is present. With a short circuit across high side 114 of load 106 and ground 124, current flowing from low side 116 of load 106 to ground 124 (e.g., current flow 128) is below the second threshold, because a short circuit across high side 114 of load 106 and ground 124 bypasses current sense circuit 112. This may be determined by controller 102 by analyzing current sense signal 122 from current sense circuit 112. To clear a short circuit across high side 114 of load 106 and low side 116 of load 106, controller 102 may disconnect load 106 from supply rail 130 by turning power switch circuit 108 off. Controller 102 may then re-initialize channel 132 of current driver 104 and determine if the short has been cleared. Identifying a short circuit across high side 114 of load 106 and ground 124 may be performed by controller 102 on a cycle-by-cycle basis while channel 132 is in a PWM and/or frequency modulation mode of operation for supplying current to load 106. For example, with power switch circuit 108 coupling supply rail 130 to high side 114 of load 106, current flow 126 should be below the first threshold. If current flow 126 remains above the first threshold, then it may be determined rather quickly that a possible short from high side 114 of load 106 to ground 124 exists.

With regard to a short circuit across low side 116 of load 106 and ground 124, controller 102 determines that drive signal 118 has been provided to power switch circuit 108

(e.g., power switch circuit 108 is on) and analyzes continuity signal 120 to determine if current flow 126 exceeds the first threshold. With a short circuit across low side 116 of load 106 and ground 124, current flow 126 will be below the first threshold because a current path between supply rail 130 and high side 114 of load 106 through continuity circuit 110 is not present. With a short circuit across low side 116 of load 106 and ground 124, current flowing from low side 116 of load 106 to ground 124 (e.g., current flow 128) is below the second threshold, because a short circuit across low side 116 of load 106 and ground 124 bypasses current sense circuit 112. This may be determined by controller 102 by analyzing current sense signal 122 from current sense circuit 112. To clear a short circuit across low side 116 of load 106 and ground 124, controller 102 may disconnect load 106 from supply rail 130 by turning power switch circuit 108 off, etc. Controller 102 may then re-initialize channel 132 of current driver 104 and determine if the short has been cleared. Identifying a short circuit across low side 116 of load 106 and ground 124 may be performed by controller 102 on a cycle-by-cycle basis while channel 132 is in a PWM and/or frequency modulation mode of operation for supplying current to load 106. For example, current flow 128 may remain below the second threshold for longer than an expected time based on a known inductance of load 106, which suggests that the current supplied to load 106 has bypassed current sense circuit 112 due to a short from low side 116 of load 106 to ground 124.

Figure 3:
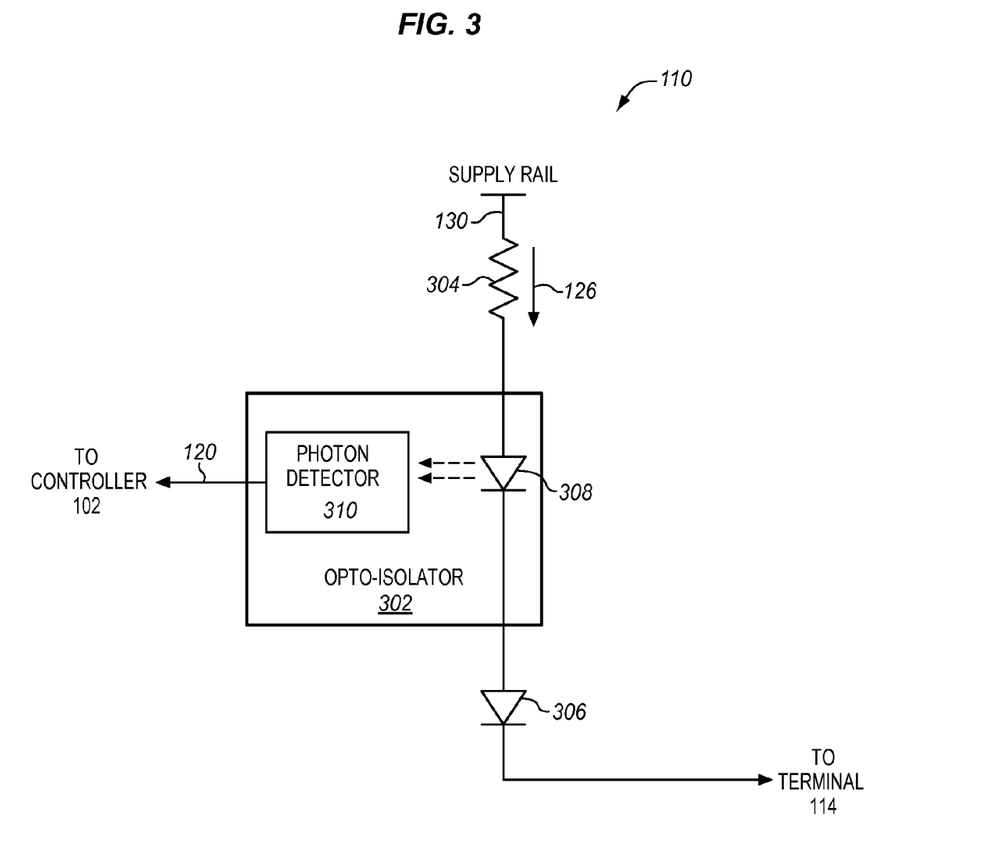
FIGS. 3-6 are schematic diagrams illustrating additional details for the block diagram of FIG. 1 in an exemplary embodiment.

FIG. 3 is a circuit diagram illustrating additional details for current driver 104 of FIG. 1 in an exemplary embodiment. In particular, FIG. 3 illustrates one possible circuit implementation for continuity circuit 110, which determines whether current flow 126 (see FIG. 1) exceeds the first threshold. In this embodiment, continuity circuit 110 includes an opto-isolator 302, a resistor 304, and an output diode 306. Opto-isolator 302 includes a Light Emitting Diode (LED) 308, which is optically coupled to a photon detector 310 (e.g., a phototransistor). LED 308 has an anode coupled to supply rail 130 by resistor 304 and a cathode coupled to high side 114 of load 106 by output diode 306. In particular, a cathode of output diode 306 is coupled to high side 114 of load 106, and an anode of output diode 306 is coupled to the cathode of LED 308. Although one particular configuration for continuity circuit 110 is illustrated in FIG. 3, one skilled in the art will understand that a variety of possible circuit configurations may be implemented to indicate to controller 102 whether current flow 126 exceeds the first threshold as a matter of design choice.

During the operation of continuity circuit 110, current flow 126 is non-zero when high side 114 of load 106 is less than supply rail 130 by a few volts (e.g., when high side 114 of load 106 is less than supply rail 130 by about two diode drops). High side 114 of load 106 may be less than supply rail 130 in cases where high side 114 of load 106 is shorted to ground 124, in cases when high side 114 of load 106 is shorted to low side 116 of load 106 (e.g., when enable switch 134 is on). When current flow 126 exceeds the first threshold, LED 308 triggers photon detector 310 to assert continuity signal 120 to controller 102. The first threshold may be small, on the order of a few milliamps.

Figure 4:
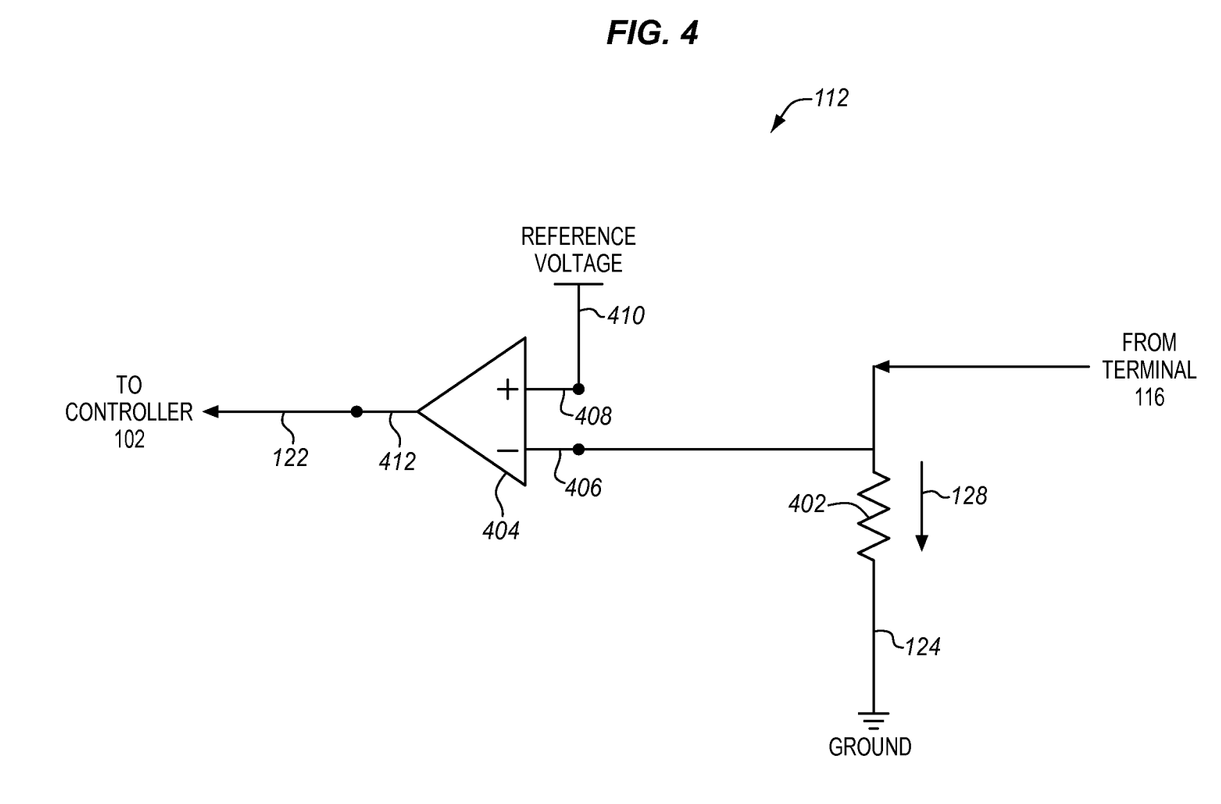

FIG. 4 is a circuit diagram illustrating additional details for current driver 104 of FIG. 1 in an exemplary embodiment. In particular, FIG. 4 illustrates one possible circuit implementation for current sense circuit 112, which determines whether current flow 128 (see FIG. 1) exceeds the second threshold. In this embodiment, current sense circuit 112 includes a current sense resistor 402 and a comparator 404. Current sense resistor 402 couples low side 116 of load 106 to ground 124. Comparator 404 has an inverting input 406 coupled to low side 116 of load 106, a non-inverting input 408 coupled to a reference voltage 410, and an output 412 which drives current sense signal 122. Although one particular configuration for current sense circuit 112 is illustrated in FIG. 4, one skilled in the art will understand that a variety of possible circuit configurations may be implemented to indicate to controller 102 whether current flow 128 exceeds the second threshold as a matter of design choice.

During operation, current flow 128 represents a current path to ground 124 for low side 116 of load 106. For example, during normal operation, current flow 128 from load 106 is approximately a current through power switch circuit 108. Current flow 128 generates a voltage across current sense resistor 402, which is compared to reference voltage 410 by comparator 404. In this embodiment, output 412 is high when the voltage generated across current sense resistor 402 (via current flow 128) is less than reference voltage 410. As current flow 128 increases, the voltage across current sense resistor 402 increases until output 412 is set low (e.g., the voltage across current sense resistor 402 is greater than reference voltage 410), which indicates to controller 102 that current flow 128 exceeds the second threshold.

In some cases, current flow 128 may be below the second threshold. Power switch circuit 108 may be off; low side 116 of load may be shorted to ground 124, which bypasses current sense circuit 112. High side 114 of load 106 may be shorted to ground 124, which also bypasses current sense circuit 112. During PWM and/or frequency modulation mode of operation, controller 102 is able to monitor current sense signal 122, which indicates whether current flow 128 exceeds the second threshold, on a cycle-by-cycle basis. This allows controller 102 to modify the duty cycle and/or the frequency for drive signal 118 and to control the average current supplied to load 106.

Figure 5:
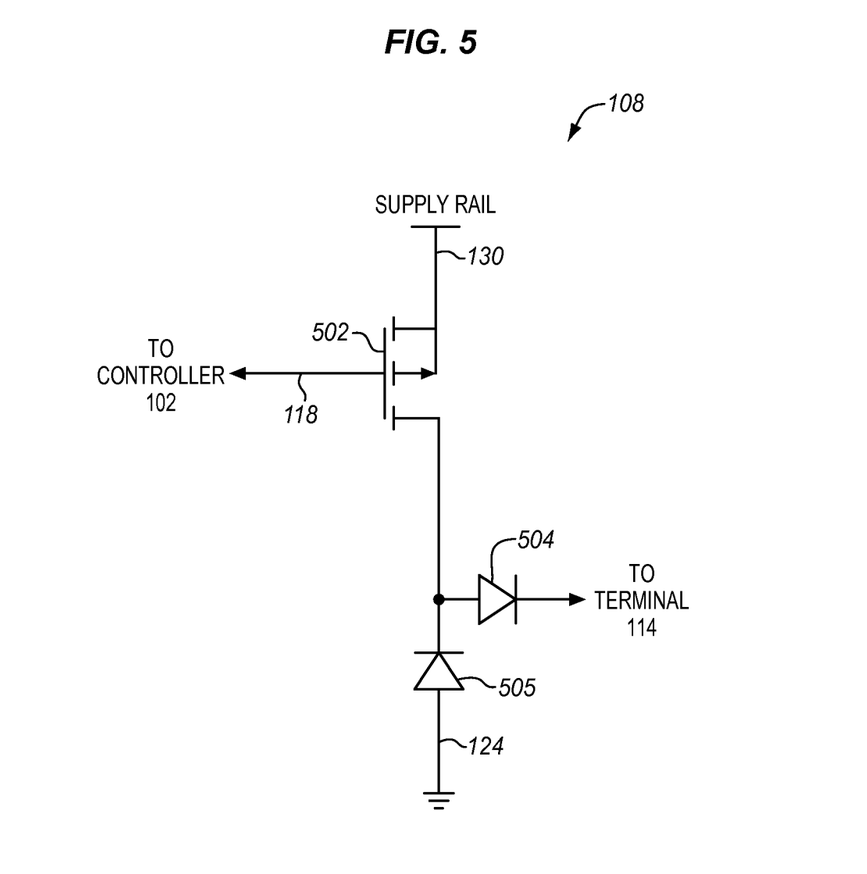

FIG. 5 is a circuit diagram illustrating additional details for current driver 104 of FIG. 1 in an exemplary embodiment. In particular, FIG. 5 illustrates one possible circuit implementation for power switch circuit 108, which couples supply rail 130 to high side 114 of load 106 in response to receiving drive signal 118. In this embodiment, power switch circuit 108 includes a P-channel FET having a source terminal coupled to supply rail 130, a gate terminal coupled to drive signal 118, and a drain terminal that is coupled to high side 114 of load 106 via an output diode 504. A flyback diode 505 is an optional diode that may be used when current driver 104 operates in a PWM and/or frequency modulation mode. Although not illustrated in FIG. 5, drive signal 118 may be level shifted prior to being applied to the gate of FET 502. For instance, controller 102 may operate at a lower voltage than supplied to load 106 by supply rail 130, in which case level shifting is used to ensure that the gate of FET 502 can be driven to the voltage of supply rail 130 to turn FET 502 off.

During operation, drive signal 118 is driven below the voltage of supply rail 130, which turns FET 502 on and couples supply rail 130 to high side 114 of load 106 through output diode 504. To turn FET 502 off, drive signal 118 is driven to the voltage of supply rail 130. During PWM and/or frequency modulation mode of operation, drive signal 118 may be duty cycle or frequency modified to control the current delivered to load 106.

Figure 6:
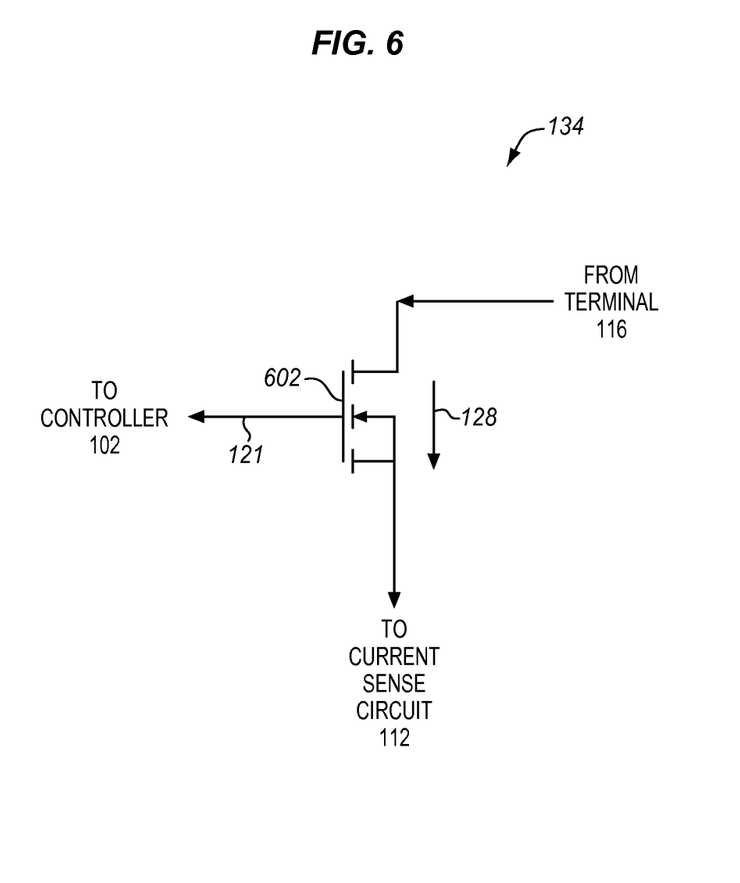

FIG. 6 is a circuit diagram illustrating additional details for current driver 104 of FIG. 1 in an exemplary embodiment. In particular, FIG. 6 illustrates one possible circuit implementation for enable switch 134, which couples low side 116 of load 106 to current sense circuit 112 in response to receiving enable signal 121. In this embodiment, enable switch 134 includes an N-channel FET 602 having a drain terminal coupled to low side 116 of load 106, a gate terminal coupled to enable signal 121, and a source terminal coupled to current sense circuit 112 (e.g., to inverting input 406 of comparator 404).

During operation, activation signal 121 is driven above the source voltage of FET 602, which turns FET 602 on and couples low side 116 of load 106 to current sense circuit 112. To turn FET 602 off, activation signal 121 is driven to the source voltage FET 602.

Utilizing the various signals (e.g., drive signal 118, current flow 126 via continuity signal 120, and current flow 128 via current sense signal 122), controller 102 is capable of determining various short circuit conditions that may exist at current driver 104. When channel 132 is in a PWM and/or frequency modulation mode, the short circuit conditions may be determined on a cycle-by-cycle basis, thereby allowing controller 102 to respond to possible short circuits rapidly. By responding quickly to possible short circuit conditions, controller 102 may implement recovery operations (e.g., turning off power switch circuit 108, turning off enable switch 134, etc.), preventing damage to current driver 104. In response to placing current driver 104 in a safe state, controller 102 may then implement a recovery phase and attempt to place channel 132 back in service. This improves the reliability and recoverability of systems that implement apparatus 100 of FIG. 1.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
a controller; and
a current driver configured to provide current to a load, the current driver comprising:
    a power switch circuit configured to couple a supply rail to a high side of the load in response to receiving a drive signal;
    a continuity circuit coupled to the supply rail and to the high side of the load that is configured to indicate to the controller whether a first current flow to the high side of the load exceeds a first threshold; and
    a current sense circuit coupling a low side of the load to ground and configured to indicate to the controller whether a second current flow from the low side of the load exceeds a second threshold;
the controller is configured to identify, based on the first current flow, the second current flow, and the drive signal, each of:
    a short circuit across the supply rail and the high side of the load;
    a short circuit across the high side of the load and the low side of the load;
    a short circuit across the high side of the load and the ground; and
    a short circuit across the low side of the load and the ground.

2. The apparatus of claim 1 wherein:
the controller is configured to identify the short circuit across the supply rail and the high side of the load responsive to a determination that the drive signal has not been provided to the power switch circuit, the first current flow does not exceed the first threshold, and the second current flow exceeds the second threshold.

3. The apparatus of claim 1 wherein:
the controller is configured to identify the short circuit across the high side of the load and the low side of the load responsive to a determination that the drive signal has been provided to the power switch circuit, the first current flow exceeds the first threshold, and the second current flow exceeds the second threshold.

4. The apparatus of claim 1 wherein:
the controller is configured to identify the short circuit across the high side of the load and the ground responsive to a determination that the drive signal has been provided to the power switch circuit, the first current flow exceeds the first threshold, and the second current flow does not exceed the second threshold.

5. The apparatus of claim 1 wherein:
the controller is configured to identify the short circuit across the low side of the load and the ground responsive to a determination that the drive signal has been provided to the power switch circuit, the first current flow does not exceed the first threshold, and the second current flow does not exceed the second threshold.

6. The apparatus of claim 1 wherein:
the controller is configured to disable the drive signal to decouple the supply rail from the high side of the load responsive to identifying at least one of:
    the short circuit across the high side of the load and the low side of the load;
    the short circuit across the high side of the load and the ground; and
    the short circuit across the low side of the load and the ground.

7. The apparatus of claim 1 wherein the current driver further comprises:

a switch electrically disposed between the low side of the load and the current sense circuit that is configured to couple the low side of the load to the current sense circuit in response to receiving an activation signal;
wherein the controller is configured to disable the activation signal to decouple the low side of the load from the current sense circuit responsive to identifying the short circuit across the supply rail and the high side of the load.

8. The apparatus of claim 1 wherein:
the power switch circuit comprises a Field Effect Transistor (FET); and
the controller is configured to identify an internal short circuit across a drain terminal of the FET and a source terminal of the FET.

9. The apparatus of claim 1 wherein the continuity circuit comprises:
an opto-isolator having a Light Emitting Diode (LED) optically coupled to a photon detector, wherein the photon detector has an output coupled to the controller that indicates whether the first current flow to the high side of the load exceeds the first threshold;
a resistor coupling the supply rail to an anode of the LED; and
a diode having a cathode coupled to the high side of the load and an anode coupled to a cathode of the LED.

10. The apparatus of claim 1 wherein the current sense circuit comprises:
a resistor coupling the low side of the load to the ground; and
a comparator having an inverting input coupled to the low side of the load, a non-inverting input coupled to a reference voltage, and an output coupled to the controller that indicates whether the second current flow from the low side of the load exceeds the second threshold.

11. A method for detecting a plurality of short circuit conditions in a current driver, the method comprising:
determining whether a drive signal is provided to a power switch circuit of the current driver to couple a supply rail to a high side of a load;
determining whether a first current flow to the high side of the load exceeds a first threshold;
determining whether a second current flow from a low side of the load exceeds a second threshold; and
identifying, based on the first current flow, the second current flow, and the drive signal, each of:
a short circuit across the supply rail and the high side of the load;
a short circuit across the high side of the load and the low side of the load;
a short circuit across the high side of the load and ground; and
a short circuit across the low side of the load and the ground.

12. The method of claim 11 wherein:
the short circuit across the supply rail and the high side of the load is identified responsive to a determination that the drive signal has not been provided to the power switch circuit, the first current flow does not exceed the first threshold, and the second current flow exceeds the second threshold.

13. The method of claim 11 wherein:
the short circuit across the high side of the load and the low side of the load is identified responsive to a determination that the drive signal has been provided to the power switch circuit, the first current flow exceeds the first threshold, and the second current flow exceeds the second threshold.

14. The method of claim 11 wherein:
the short circuit across the high side of the load and the ground is identified responsive to a determination that the drive signal has been provided to the power switch circuit, the first current flow exceeds the first threshold, and the second current flow does not exceed the second threshold.

15. The method of claim 11 wherein:
the short circuit across the low side of the load and the ground is identified responsive to a determination that the drive signal has been provided to the power switch circuit, the first current flow does not exceed the first threshold, and the second current flow does not exceed the second threshold.

16. The method of claim 11 further comprising:
disabling the drive signal to decouple the supply rail from the high side of the load responsive to identifying at least one of:
the short circuit across the high side of the load and the low side of the load;
the short circuit across the high side of the load and the ground; and
the short circuit across the low side of the load and the ground.

17. An apparatus comprising:
a controller; and
a current driver configured to provide current to a load, the current driver comprising:
a power switch configured to couple a supply rail to a high side of the load in response to receiving a drive signal;
an opto-isolator having a Light Emitting Diode (LED) optically coupled to a photon detector, wherein the photon detector has an output terminal coupled to the controller that indicates whether a first current flow to the high side of the load exceeds a first threshold;
a first resistor coupling the supply rail to an anode of the LED;
a diode having a cathode coupled to the high side of the load and an anode coupled to a cathode of the LED;
a second resistor coupling a low side of the load to ground; and
a comparator having an inverting input coupled to the low side of the load, a non-inverting input coupled to a reference voltage that defines a second threshold, and an output coupled to the controller that indicates whether a second current flow through the second resistor exceeds the second threshold;
the controller is configured to identify, based on the first current flow, the second current flow, and the drive signal, each of:
a short circuit across the supply rail and the high side of the load;
a short circuit across the high side of the load and the low side of the load;
a short circuit across the high side of the load and ground; and
a short circuit across the low side of the load and the ground.

18. The apparatus of claim 17 wherein:
the power switch comprises a Field Effect Transistor (FET); and
identifying the short circuit across the supply rail and the high side of the load comprises:

identifying an internal short circuit across a drain
        terminal of the FET and a source terminal of the FET.
    19. The apparatus of claim 17 wherein:
    the controller is further configured to disable the drive
        signal to decouple the supply rail from the high side of
        the load responsive to identifying at least one of:
        the short circuit across the high side of the load and the
            low side of the load;
        the short circuit across the high side of the load and the
            ground; and
        the short circuit across the low side of the load and the
            ground.
    20. The apparatus of claim 17 wherein the current driver
further comprises:
    a switch electrically disposed between the low side of the
        load and the second resistor that is configured to couple
        the low side of the load to the second resistor in
        response to receiving an activation signal;
    wherein the controller is further configured to disable the
        activation signal to decouple the low side of the load
        from the second resistor responsive to identifying the
        short circuit across the supply rail and the high side of
        the load.

* * * * *